United States Patent [19]

Oshiba

[11] Patent Number: 5,229,985
[45] Date of Patent: Jul. 20, 1993

[54] DATA RECORDING/REPRODUCING APPARATUS CAPABLE OF DETECTING DATA RECORDING STATE

[75] Inventor: Mitsuo Oshiba, Hachioji, Japan

[73] Assignee: Olympus Optical Co., Ltd., Tokyo, Japan

[21] Appl. No.: 703,363

[22] Filed: May 21, 1991

[30] Foreign Application Priority Data

May 29, 1990 [JP] Japan .................... 2-139188

[51] Int. Cl.$^5$ .................... G11B 3/90; G11B 7/00
[52] U.S. Cl. .................... 369/54; 369/58; 369/59; 369/124
[58] Field of Search .................... 369/54, 58, 59, 124; 235/454, 456

[56] References Cited

U.S. PATENT DOCUMENTS

| | | | |
|---|---|---|---|
| 4,308,612 | 12/1981 | Miyauchi et al. | 369/54 |
| 4,572,965 | 2/1986 | Yamamura | 369/59 |
| 4,689,778 | 8/1987 | Miura et al. | 369/54 |
| 4,901,301 | 2/1990 | Senshu | 369/54 |
| 4,924,447 | 5/1990 | Fuji et al. | 369/124 |
| 4,953,151 | 8/1990 | Imanaka | 369/54 |
| 4,956,832 | 9/1990 | Miyasaka | 369/54 |
| 5,008,521 | 4/1991 | Ohki et al. | 235/456 |
| 5,027,339 | 6/1991 | Yoda et al. | 369/54 |
| 5,060,218 | 10/1991 | Chiyomatsu | 369/58 |
| 5,077,721 | 12/1991 | Sako et al. | 369/59 |

FOREIGN PATENT DOCUMENTS 63-53724  3/1988  Japan .

*Primary Examiner*—Aristotelis Psitos
*Assistant Examiner*—P. W. Huber
*Attorney, Agent, or Firm*—Frishauf, Holtz, Goodman & Woodward

[57] ABSTRACT

A data recording/reproducing apparatus for recording/reproducing data by use of a recording medium comprises a detector for receiving light beams from a predetermined portion of the recording medium and outputting a corresponding reproduction signal. A first measuring unit measures a time period during which an average level of the reproduction signal output from the detector exceeds a reference value, and outputs a first measurement signal. A second measuring unit measures the number of times, at which an interval of pits recorded on the recording medium meets a predetermined modulation rule, by use of the reproduction signal, and outputs a second measurement signal. A discriminating unit discriminates the recording state of the predetermined portion of the recording medium, on the basis of the first and second measurement signals.

7 Claims, 3 Drawing Sheets

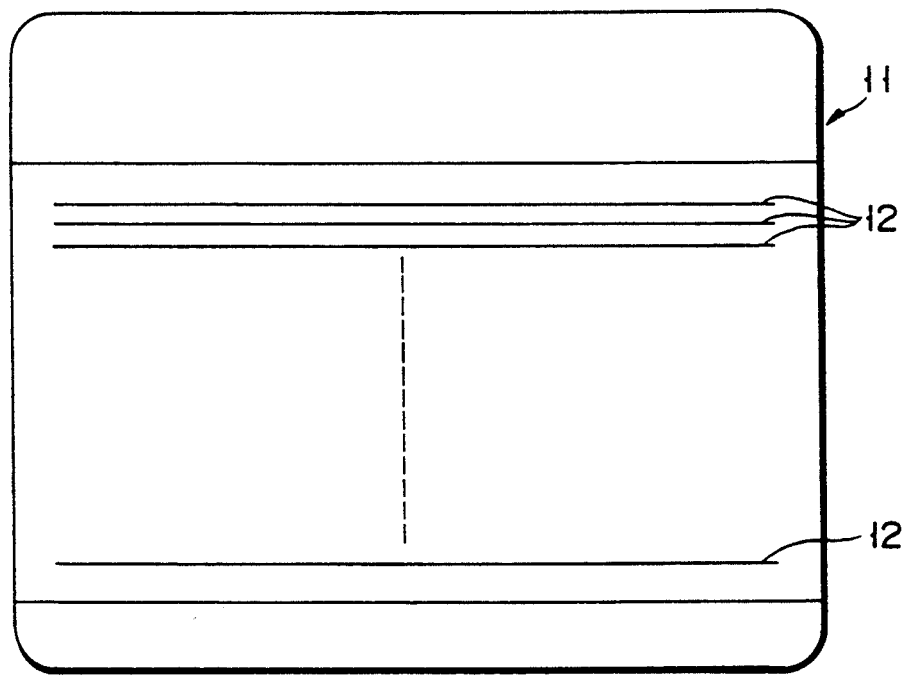
F I G. 2

DATA RECORDING/REPRODUCING APPARATUS CAPABLE OF DETECTING DATA RECORDING STATE

BACKGROUND OF THE INVENTION

1. Field of the Invention

The present invention relates to a data recording/reproducing apparatus capable of recording/reproducing desired data by use of a recording medium.

2. Description of the Related Art

Of data recording/reproducing apparatuses such as optical disc apparatuses and optical card apparatuses, there is a data recording/reproducing apparatus for recording/reproducing data by use of a non-rewritable recording medium.

If data is doubly written on a data-recorded region, such as a track or a sector, of such a non-rewritable recording medium, not only the previously recorded data but also newly recorded data cannot be reproduced. In order to prevent the occurrence of this undesirable situation, it is necessary to exactly check in advance whether or not data has been stored on the target track or sector.

Published Unexamined Japanese Patent Application No. 63-53724 discloses a technique of determining whether data is recorded on a recording region by counting the number of pits in the recording region and detecting whether or not the counted value is above a predetermined value, thus preventing overwriting of data.

In this type of data recording/reproducing apparatus, however, the presence/absence of data is determined only on the basis of the fact that the number of pits is or is not above a predetermined value. A recording area on which data is normally recorded cannot be distinguished from a recording area on which data is doubly written (overwritten). Consequently, when the data on the overwritten area is reproduced, normal reproduction cannot be effected and the reproduction must be retried more times than required. This degrades a data reproduction access time.

On the other hand, in some cases, data on an unneeded recorded area or sector is intentionally destroyed by overwrite, for example, in order to keep secrecy. This is called data erasure. In this case, too, it is necessary to check, in advance, whether a target track or sector has been subjected to data erasure. In connection with this, there is a concern that the number of pits cannot be counted because of the destruction of pits and the "non-recorded state" of the track or sector may be determined, although the data has actually been erased.

SUMMARY OF THE INVENTION

The object of the present invention is to provide a data recording/reproducing apparatus capable of determining whether the data recording state of a sector or a track of a recording medium is the "data non-recorded state" (no data has been recorded), "data normal recorded state" (data is normally recorded), or "data-erased state" (data has been erased) (or "data overwritten state" (data has been overwritten)).

In order to achieve the above object, there is provided a data recording/reproducing apparatus for recording/reproducing data by use of a recording medium, said apparatus comprising:

detecting means for receiving light beams from a predetermined portion of the recording medium and outputting a corresponding reproduction signal;

first measuring means for measuring a time period during which an average level of the reproduction signal output from the detecting means exceeds a predetermined value, and outputting a first measurement signal;

second measuring means for measuring the number of times, at which an interval of pits recorded on the recording medium meets a predetermined modulation rule, by use of the reproduction signal output from the detecting means, and outputting a second measurement signal; and discriminating means for discriminating the recording state of the predetermined portion of the recording medium, on the basis of the first and second measurement signals from the first and second measuring means.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 shows the structure of an optical card; and

DETAILED DESCRIPTION OF THE PREFERRED EMBODIMENTS

A data recording/reproducing apparatus according to the present invention will now be described with reference to the accompanying drawings.

FIG. 2 shows an example of the whole structure of an optical card serving as a recording medium on which data is recorded by the data recording/reproducing apparatus of the present invention.

An optical card 11 has a plurality of tracks 12 extending in its longitudinal direction in parallel. Each track 12 consists of a single sector or a plurality of sectors.

Figure 3:
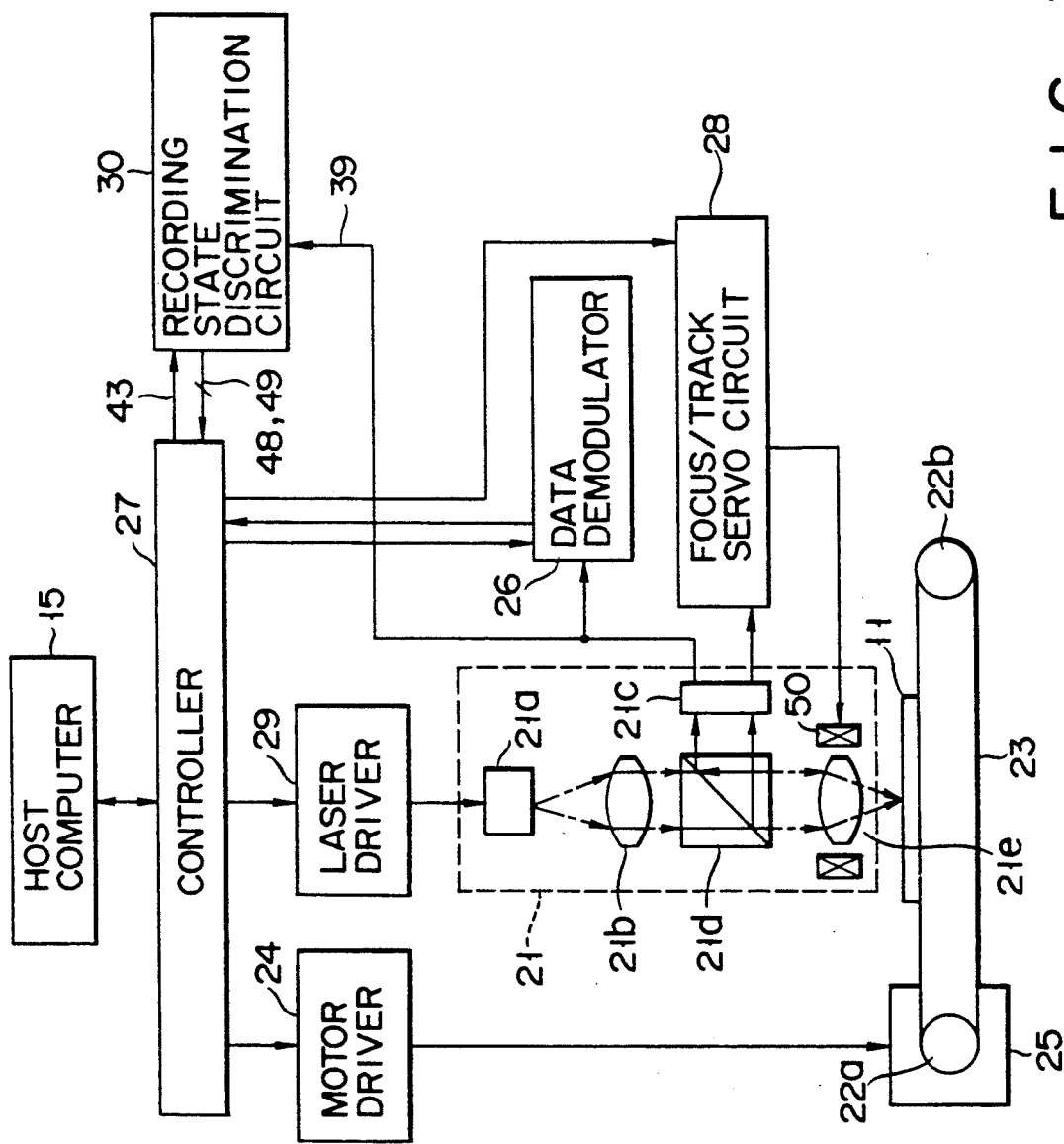
FIG. 3 shows the structure of a data recording/reproducing apparatus to which the recording state determining circuit of FIG. 1 is applied.

FIG. 3 shows an example of the structure of the data recording/reproducing apparatus of the present invention. In the data recording/reproducing apparatus, data is recorded/reproduced by moving the optical card 11 in the direction of tracks and also by moving an optical head 21 along a line perpendicular to the tracks 12.

The optical card 11 is mounted at a predetermined location on a convey belt 23 passed over between pulleys 22a and 22b. A motor driver 24 drives a motor 25, thereby moving the optical card 11 in the direction of tracks 12 reciprocally.

The optical head 21 is constituted such that write/read beams emitted from a laser diode 21a are converted to parallel beams through a collimator lens 21b, and the parallel beams are focused on the optical lens 11 through a prism 21d and an objective lens 21e. The beams reflected by the optical card 11 are made incident on a detector 21c through the objective lens 21e and prism 21d. An output from the detector 21c is demodulated by a data demodulator 26 and converted into a read-out data signal. The data signal is supplied to a controller 27. The output from the detector 21c is delivered to a recording state discrimination circuit 30. The circuit 30 generates a recording state discrimination signal (or count results 48, 49 described later) and delivers it to the controller 27.

The output from the detector 21c is also supplied to a focus-track servo circuit 28, and a focus error signal and a track error signal are generated and fed to an actuator 50. The actuator 50 moves the objective lens 21e in the focusing and tracking directions. Thus, the spot of the incident beam is kept in focus at the center of the target track on the optical card 11.

The controller 27 controls a laser driver 29 and the aforementioned motor driver 24, focus-track servo circuit 28, data demodulator 26 and recording state discrimination circuit 30. In the data recording mode, the controller 27 modulates and converts data fed from a host computer 15 to an error correction code, and writes it on a desired sector on the optical card 11. In the data reproducing mode, the controller 27 reads data from a desired sector on the card 11 and demodulates it. The reproduced data, after it is subjected to error correction, is transferred to the host computer 15.

Figure 1:
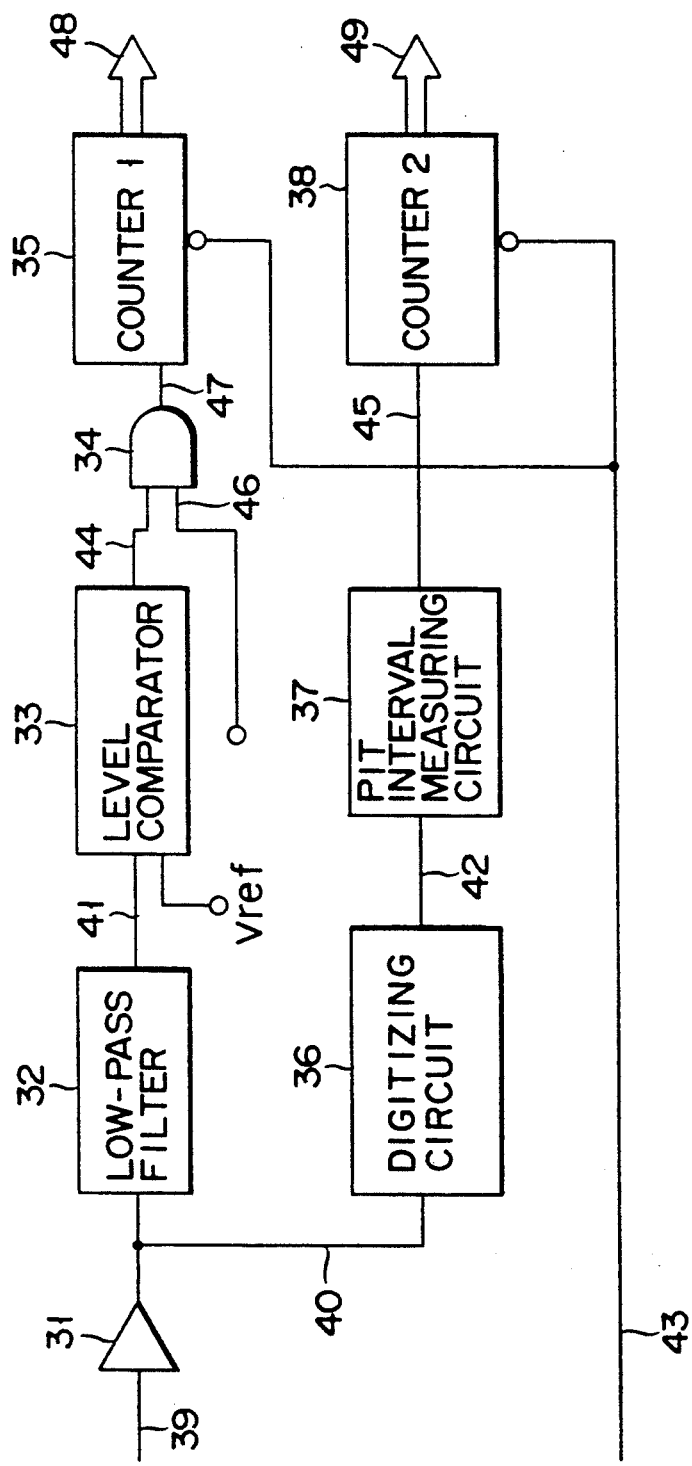
FIG. 1 shows the circuit configuration of a recording state determining circuit.

Referring to FIG. 1, the recording state discrimination circuit 30 which characterizes the present invention will now be described.

An analog reproduction signal 39 is output from the detector 21c to an input buffer 31. A signal 40 output from the buffer 31 is supplied to a low-pass filter 32 and a digitizing circuit 36. The low-pass filter 32 detects an average level of the analog reproduction signal and outputs an average-level signal 41. The average-level signal 41 is supplied to a level comparator 33 and compared with a reference value Vref. The comparison result 44 is supplied to one input terminal of an AND circuit 34. The reference value is set to a value lower than an output level from the low-pass filter 32 obtained from a data-recorded sector and a data-erased sector, and higher than an output level obtained from a non-recorded sector.

The other input terminal of the AND circuit 3 receives a sampling clock 46. An output 47 from the AND circuit 34 is supplied to a clock terminal of a first counter 35. A reset signal 43 is supplied from the controller 37 to a reset terminal of the first counter 35. The reset signal 43 is generated for each sector, and the first counter 35 is initialized each time it receives the reset signal 43. Specifically, the first counter 35 samples and counts an average level of the data within the sector, thereby obtaining data relating to the state in which data has been recorded or the state in which data has been erased.

On the other hand the digitizing circuit 36 converts a recording data component in the analog reproduction signal 39 into a binary signal 42, and supplies it to a pit interval measuring circuit 37. The pit interval measuring circuit 37 measures a pit interval of the binary signal 42, that is, an interval of pits recorded on the optical card 11, thereby determining whether the pit interval is within a modulation rule range. If it is in the range, a clock signal 45 is supplied to a second counter 38.

A reset terminal of the second counter 38 receives the reset signal 43 from the controller 27, and the second counter 38 is initialized for each sector. Specifically, the second counter 38 counts the number of data in a sector included in the modulation rule range.

The count result 48 of the first counter 35 and the count result 49 of the second counter 38 are supplied to the controller 27 as recording state discrimination signals. Depending on whether or not the count results exceed a predetermined value, the controller 27 carries out discrimination, as shown in Table 1. Thus, in this invention, the "data non-recorded state", "data-erased state", and "data normal recorded state" are determined for each sector.

TABLE 1

| Count Result of 1st Counter | Count Result of 2nd Counter | Determination Result |
|---|---|---|
| Less than Reference Value | Less than Reference Value | Data Non-Recorded state |
| Less than Reference Value | Reference Value of above | Impossible |
| Reference Value of above | Less than Reference Value | Data-Erased State |
| Reference Value or above | Reference Value or above | Data Normal Recorded state |

The obtained discrimination result is supplied to the host computer 15 or shown on a display (not shown).

As described above, according to this embodiment, it is determined whether or not the two counted values exceed the reference value, thereby discriminating the "data non-recorded state", "data-erased state", and "data normal recorded state". By changing the reference value, the recording state of the sectors having different sizes can be determined.

In the present invention, on the basis of the sampling result of the average level of data in the sector, the "data non-recorded state", "data-erased state", and "data normal recorded state" are discriminated. In addition, depending on whether or not the data in the sector meets a predetermined rule, the "data normal recorded state" and "data-erased (overwritten) state" are discriminated. Thus, the data recording/reproducing apparatus capable of determining the recording state of all data in the sectors can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data recording/reproducing apparatus for recording/reproducing data by use of a recording medium, said apparatus comprising:

detecting means for receiving light beams from a predetermined portion of the recording medium and outputting a corresponding reproduction signal;

first measuring means for measuring a time period during which an average level of the reproduction signal output from the detecting means exceeds a predetermined value, and outputting a first measurement signal;

second measuring means for measuring the number of times, at which an interval of pits recorded on the recording medium meets a predetermined modulation rule, by use of the reproduction signal output from the detecting means, and outputting a second measurement signal; and discriminating means for discriminating a recording state of the predetermined portion of the recording medium, on the basis of the first and second measurement signals from the first and second measuring means, said discriminating means including means for;

determining that said recording state is a state in which no data has been recorded, when neither a value of the first measurement signal nor a value of the second measurement signal reaches a reference value, and determining that said recording state is a state in which data is normally recorded, when the values of both said first and second measurement signals are equal to or higher than the reference value.

2. The apparatus according to claim 1, wherein said first measuring means comprises:

low pass filter means for detecting the average level of the reproduction signal and for producing an average level signal in response thereto, level comparator means for comparing said average level signal from the low-pass filter means with a reference value and for producing a comparison result in response thereto, and counter means for counting the comparison result and for producing said first measurement signal in response thereto.

3. The apparatus according to claim 2, wherein said first measuring means further comprises AND circuit means for supplying said comparison result to said counter means with a predetermined timing as an AND signal in response to the comparison result from the level comparator means and a predetermined sampling clock.

4. The apparatus according to claim 1, wherein said second measuring means comprises digitizing means for converting the reproduction signal into a binary output, and means for measuring a pulse interval of the binary output to determine the number of times at which the pulse interval meet the predetermined modulation rule.

5. The apparatus according to claim 1, wherein said predetermined portion of the recording medium is a sector on the recording medium.

6. The apparatus according to claim 1, wherein said predetermined portion of the recording medium is a track on the recording medium.

7. A data recording/reproducing apparatus for recording/reproducing data by use of a recording medium, said apparatus comprising:

detecting means for receiving light beams from a predetermined portion of the recording medium and outputting a corresponding reproduction signal;

first measuring means for measuring a time period during which an average level of the reproduction signal output from the detecting means exceeds a predetermined value, and outputting a first measurement signal;

second measuring means for measuring the number of times, at which an interval of pits recorded on the recording medium meets a predetermined modulation rule, by use of the reproduction signal output from the detecting means, and outputting a second measurement signal; and discriminating means for discriminating a recording state of the predetermined portion of the recording medium, on the basis of the first and second measurement signals from the first and second measuring means, said discriminating means including means for:

determining that said recording state is a state in which no data has been recorded, when neither a value of the first measurement signal nor a value of the second measurement signal reaches a reference value, determining that said recording state is a state in which data has been erased, when the first measurement signal is equal to or higher than the reference value and the second measurement signal is lower than the reference value, and determining that said recording state is a state in which data is normally recorded, when the values of both said first and second measurement signals are equal to or higher than the reference value.

* * * * *